United States Patent
Martin, Jr. et al.

(10) Patent No.: US 6,633,884 B2
(45) Date of Patent: Oct. 14, 2003

(54) SYSTEM AND METHOD FOR ANALYZING A DATABASE FOR ON-LINE REORGANIZATION

(75) Inventors: James L. Martin, Jr., Round Rock, TX (US); George Norman Crown, Jr., Sugar Land, TX (US)

(73) Assignee: BMC Software, Inc., Houston, TX (US)

(*) Notice: Subject to any disclaimer, the term of this patent is extended or adjusted under 35 U.S.C. 154(b) by 379 days.

(21) Appl. No.: 09/827,064

(22) Filed: Apr. 3, 2001

(65) Prior Publication Data

US 2002/0143763 A1 Oct. 3, 2002

(51) Int. Cl.$^7$ .............................................. G06F 17/30
(52) U.S. Cl. ......................... 707/101; 707/7; 707/102; 707/103 R; 707/104.1
(58) Field of Search ............................ 707/1, 2, 3, 6, 707/7, 8, 100, 101, 200, 201, 202, 205, 103 R, 104.1; 709/100, 101, 102, 103, 104, 105, 200, 201, 202, 203

(56) References Cited

U.S. PATENT DOCUMENTS

| | | | | |
|---|---|---|---|---|
| 4,205,371 A | * | 5/1980 | Feather ........................ | 707/101 |
| 4,949,388 A | * | 8/1990 | Bhaskaran .................... | 382/159 |
| 5,396,623 A | * | 3/1995 | McCall et al. ............... | 707/101 |
| 5,455,944 A | * | 10/1995 | Haderle et al. .............. | 707/202 |
| 5,479,654 A | * | 12/1995 | Squibb ........................ | 707/201 |
| 5,517,641 A | * | 5/1996 | Barry et al. ................. | 707/101 |
| 5,721,915 A | * | 2/1998 | Sockut et al. ................ | 707/200 |
| 5,758,357 A | * | 5/1998 | Barry et al. ................. | 707/202 |
| 5,761,667 A | * | 6/1998 | Koeppen ..................... | 707/101 |
| 5,781,903 A | * | 7/1998 | Rusterholz .................. | 707/101 |
| 5,881,379 A | * | 3/1999 | Beier et al. .................. | 707/101 |
| 5,887,274 A | * | 3/1999 | Barry et al. ................. | 707/202 |
| 5,933,820 A | | 8/1999 | Beier et al. .................. | 707/1 |
| 5,940,813 A | * | 8/1999 | Hutchings .................... | 705/43 |
| 5,963,982 A | * | 10/1999 | Goldman ..................... | 711/170 |
| 5,983,239 A | * | 11/1999 | Cannon ...................... | 707/200 |

(List continued on next page.)

OTHER PUBLICATIONS

Wietrzyk, Vlad I. S. et al., "ADDROL: A Method for On–line Reorganization in a Multisystem DBMS with Shared Disks", Seventh International Conference on Parallel and Distributed Systems: Workshops, Oct. 2000, pp. 378–383.*

Schoning, H. et al., "Extending and Configuring the PRIMA Database Management System Kernel", PARBASE–90, International Conference on Databases, Parallel Architechtures and Their Applications, Mar. 7–9, 1990, p. 555 (one page).*

*Primary Examiner*—Shahid Al Alam
(74) *Attorney, Agent, or Firm*—Wong, Cabello, Lutsch, Rutherford & Brucculeri, LLP (57) ABSTRACT

An improved method and system for analyzing a database for determining a recommended reorganization of a database. In one embodiment, the method involves receiving a list of database records to be analyzed. Each analyzed database record which meets certain criteria may be designated as "qualified". Identifying information for each qualified database record may be added to a detail array. The qualified database record information may be aggregated based on information in the detail array. The process of aggregating the qualified database record information may include constructing additional arrays (e.g., a roll-up array and a results tracking array). A reorganization strategy may be recommended based on the aggregated qualified database record information. The recommended reorganization strategy may be for an amount (e.g., none, full, partial) of reorganization of the database and a method (e.g., off-line, concurrent, on-line) of reorganization of the database. The recommended reorganization strategy may be implemented.

42 Claims, 4 Drawing Sheets

U.S. PATENT DOCUMENTS

| | | | | |
|---|---|---|---|---|
| 5,991,761 A | * | 11/1999 | Mahoney et al. | 707/100 |
| 5,991,772 A | * | 11/1999 | Doherty et al. | 707/202 |
| 6,026,412 A | * | 2/2000 | Sockut et al. | 707/200 |
| 6,122,640 A | * | 9/2000 | Pereira | 707/103 R |
| 6,144,970 A | * | 11/2000 | Bonner et al. | 707/206 |
| 6,185,601 B1 | * | 2/2001 | Wolff | 709/203 |
| 6,411,964 B1 | * | 6/2002 | Iyer et al. | 707/200 |
| 6,418,443 B1 | * | 7/2002 | Martin, Jr. | 707/101 |

* cited by examiner

| BIPF Value | MBI Value | Count of DBRs this level | Blocks Improved this level | Total Size of DBR at this level |
|---|---|---|---|---|
| 75 | 20 | 1 | 20 | 100,000 |
| 75 | 10 | 4 | 40 | 150,000 |
| 60 | 40 | 10 | 400 | 350,000 |
| 60 | 15 | 25 | 375 | 290,000 |
| 50 | 65 | 15 | 975 | 550,000 |
| 50 | 20 | 6 | 120 | 185,000 |

*Detail Array*

*FIG. 4*

| BIPF Value | MBI Value | Total Count of DBRs this level | Total Blocks Improved this level | Total Size of DBR this level |
|---|---|---|---|---|
| 75 | 20 | 1 | 20 | 100,000 |
| 75 | 10 | 5 | 60 | 250,000 |
| 60 | 40 | 10 | 400 | 350,000 |
| 60 | 15 | 36 | 795 | 740,000 |
| 50 | 65 | 15 | 975 | 550,000 |
| 50 | 20 | 32 | 1515 | 1,185,000 |

*Roll-up Array*

*FIG. 5*

| Rank | BIPF Value | MBI Value | Total Size of DBR reorganized | I/O Saved per Megabyte Moved | Count of DBR reorganized |
|---|---|---|---|---|---|
| 1 | 50 | 65 | 550,000 | 1772 | 15 |
| 2 | 50 | 20 | 1,185,000 | 1278 | 32 |
| 3 | 60 | 40 | 350,000 | 1143 | 10 |
| 4 | 60 | 15 | 740,000 | 1074 | 36 |
| 5 | 75 | 10 | 250,000 | 240 | 5 |
| 6 | 75 | 20 | 100,000 | 200 | 1 |

*Results Tracking Array*

*FIG. 6*

SYSTEM AND METHOD FOR ANALYZING A DATABASE FOR ON-LINE REORGANIZATION

BACKGROUND OF THE INVENTION

1. Field of the Invention

The present invention relates to computer software, and more particularly to reorganizing databases.

2. Description of the Related Art

The IMS database (IMS DB) was created in 1970 by International Business Machines Corporation (IBM) and is one of the two major parts to IBM's IMS/ESA (Information Management System/Enterprise Systems Architecture). The second part is a data communications system (IMS Transaction Manager or IMS TM). Together, the transaction manager and the database manager create a complete on-line transaction processing environment providing continuous availability and data integrity. IMS/ESA runs under the MVS/ESA or OS/390 operating systems, which run on the S/390 platform.

At the heart of IMS DB are its databases and its data manipulation language, Data Language/I (DL/I). The IMS database is a hierarchical (non-relational) database. IMS databases are hierarchic collections of data, information organized in a pyramid fashion with data at each level of the hierarchy related to, and in some way dependent upon, data at the higher level of the hierarchy. DUI calls allows a user to create and access these IMS databases. The terms "user" and "customer" are synonyms; therefore, any reference to "user" may be interchanged with "customer" herein.

An IMS database may include one or more data set groups. Each data set group may include one or more segments. A segment is the smallest piece of data DL/I can store. Each segment may be qualified by its hierarchical relationship to other segments in a database record. Each database record has one root segment and zero or more child segments. A "root segment" is at the top of the hierarchy, and there may be only one root segment in a database record. All other segments (other than the one root segment) in a database record are referred to as "dependent segments", and their existence depends on there being a root segment (i.e., dependent segments are hierarchically related to the root segment). A "parent segment" is any segment that is defined in the database descriptor (DBD) as capable of having a dependent segment beneath it in the hierarchy. A "child segment" is any segment that is a dependent on another segment above it in the hierarchy.

Segments may be of various segment types. Those segments which share similar qualities are of the same type. For example, if the root segment of a database record represents a course, and that root segment has three child segments labeled: instructor, student, and location, those child segments may be referred to as segment types.

An IMS database record may be divided into a number of different segment types (e.g., from 1 segment type up to 127 segment types). The database structure may have up to 15 levels of hierarchy. Each additional level of hierarchy creates a parent/child relationship between the two levels with the root segment being the parent of all the segments in the database record. Each segment type is defined as either fixed or variable in size.

The root segment is referred to as a first level of the IMS database, direct children of the root segment are referred to as a second level of the IMS database. As used herein, a second level of the IMS database may alternatively be referred to as a first level child segment, as child segments may only appear starting with the second level of the IMS database. Similarly, children of the children of the root segment (i.e., grandchildren of the root segment) are referred to as a third level of the IMS database, or alternatively, second level child segments. The level of each subsequent generation of children may be determined by incrementing the previous level by one (e.g., a fourth level of the IMS database is equivalent to a third level child segment).

As used herein, a "block" is a fixed length section of data. As used herein, a "control interval (CI)" denotes the smallest data container for a VSAM (Virtual Sequential Access Method) data set. It is noted that VSAM is a product of IBM Corporation. The terms "block" and "control interval" are synonyms; therefore, any reference to "block" may be interchanged with "control interval" herein.

An IMS database is typically divided into either blocks or control intervals. The size of an IMS database may be defined as the total number of blocks or control intervals in the database. As segments are created for a new database record, the segments may be added to a block until the block can no longer hold another full segment. At that time, a new block may be selected and any additional segments for the database record may be placed in the new block. This process may continue until no more segments are created for the database record. At that time, the database record is contained within a given number of database blocks. When each block of the database record contains only segments for the same database record, and is full (i.e., is not able to hold segments for this or any other database record), then the database record may be referred to as optimally organized for data retrieval. Typically, access to an optimally organized database record requires a number of input/output (I/O) operations equal to the number of blocks holding the database record.

An IMS database includes ten data set groups into which segments of an IMS database may be written. Each segment type may only be assigned to one data set group. When IMS databases are created, definitions of which data set group each segment type is to be written to are specified. In some cases, an IMS database may also be divided into partitions, in addition to being distributed across data set groups. A database record is made up of a root segment and child segments. As an IMS database is used, segments and database records are added, modified and deleted. Over time, the child segments of a database record may become scattered across different blocks within a data set group, resulting in slower access times and longer latencies than would occur if the child segments were closer together. Reorganizing the location of the various segments of an IMS database such that segments of database records are closer together results in faster access times and shorter latencies.

All space within an IMS database is shared space, therefore a block may hold segments from one or more database records. When segments are added to a database record after initial creation of the database record, it is often necessary for these added segments to be placed into blocks that do not currently hold segments for the database record. As more and more segments are added to the database record, the database record begins to lose optimal organization qualities because the segments typically occupy more blocks than would be necessary to hold the database record if the database record was contained within an optimal number of blocks. Therefore, access to such a database record typically requires a number of I/O operations equal to the total number of blocks now occupied by the database record. The number of I/O operations in excess of the optimal number may be extensive if the number of partially occupied blocks the database records spans is high. When the number of I/O operations exceeds the optimal number, database and application performance may degrade. Therefore, it is desirable to reorganize an IMS database when many of the database records exhibit these characteristics.

Figure 3:
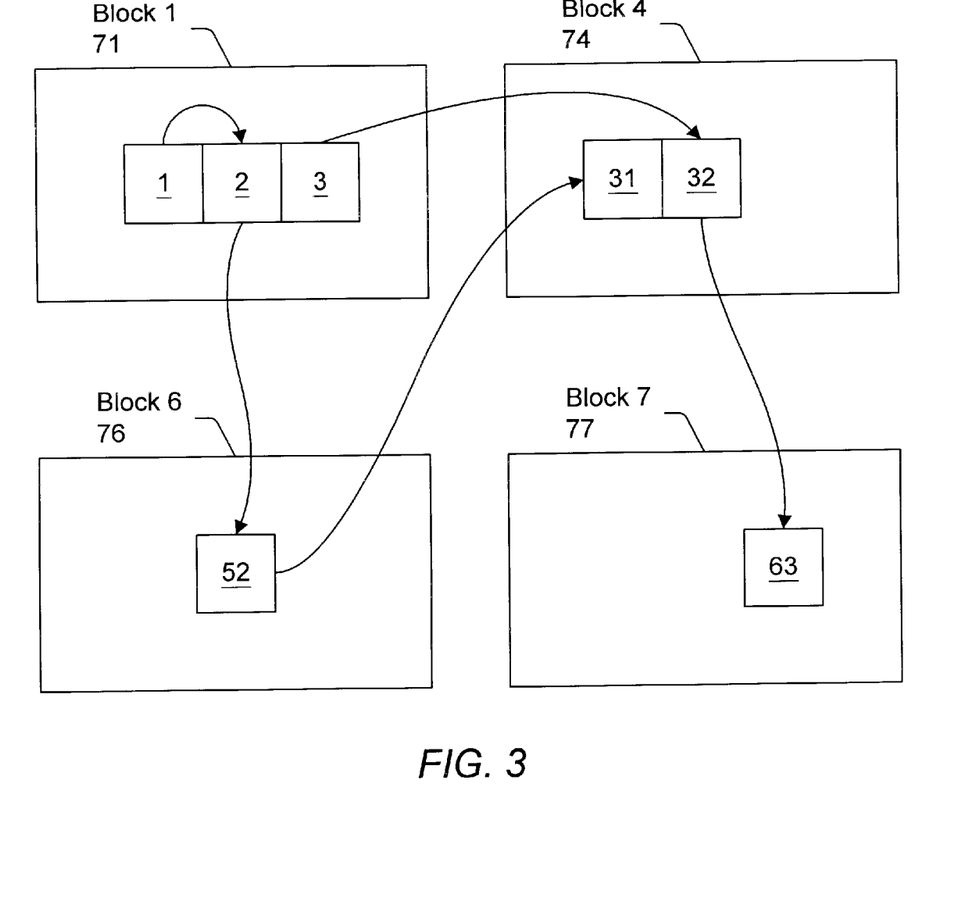
FIG. 3 illustrates two examples of fragmented database records in an IMS database.

The need to reorganize an IMS database stems from the dynamic nature of insertions and deletions of segments in an IMS database. In general, as new child segments are added to an IMS database hierarchy, the segments may be added to blocks depending on space availability. As a result, related segments (i.e., segments belonging to the same database record) may be stored in different blocks, possibly non-contiguous blocks. This results in a fragmented database, as shown in FIG. 3. As a result, access of a database record may require reading a number of non-contiguous blocks, which results in lengthier access times. One method of reducing access times is to reorganize the IMS database in order to more closely position segments belonging to the same database record.

Reorganizing an IMS database in order to speed up the access times and reduce the latencies is more desirable to the user if user access to the IMS database may be maintained during the reorganization (i.e., on-line reorganization). Additionally, it is desirable to recommend the optimal number of fragmented database records to reorganize, rather than to recommend reorganizing all of the fragmented database records of a database. An optimal recommendation, when implemented, may yield a partially reorganized database by minimizing the amount of data movement while yielding the greatest results in terms of input/output (I/O) reduction. For at least the foregoing reasons, there is a need for an improved system and method for analyzing a database, such as an IMS database, to determine an on-line reorganization recommendation of the database, preferably an optimal on-line reorganization recommendation of the database.

SUMMARY OF THE INVENTION

The present invention provides various embodiments of an improved method and system for analyzing a database for determining an approach for reorganization of the database. In one embodiment, the method involves receiving a list of database records to be analyzed. Each database record on the list may be analyzed. Updates to the database may be performed while the analyzing occurs. Each analyzed database record on the list which meets certain criteria may be designated as "qualified". The criteria used to determine if a database record is "qualified" may include using one or more qualifying control variables to determine if each database record is a qualified database record. The qualifying control variables may include one or more of: a block improvement percentage factor, a minimum block improvement factor, and a minimum input/output savings factor. The criteria may require the block improvement percentage factor to be greater than or equal to one percent and the minimum block improvement factor to be greater than or equal to one. Alternatively, the criteria may require the block improvement percentage factor to be greater than or equal to one percent and the minimum block improvement factor to be equal to the minimum input/output savings factor.

Identifying information for each qualified database record may be added to a detail array. The process of adding identifying information for each qualified database record to the detail array may include: creating an entry (e.g., a count element, a blocks improved element, and a total size of database record element) in the detail array upon the first occurrence of values for a given set of qualifying control variables; incrementing the count element of a given entry in the detail array when a second or subsequent occurrence of the values for the given set of qualifying control variables is found; incrementing the blocks improved element of a given entry in the detail array when a second or subsequent occurrence of the values for the given set of qualifying control variables is found; and incrementing the total size of database record element of a given entry in the detail array when a second or subsequent occurrence of the values for the given set of qualifying control variables is found. The given set of qualifying control variables may include the block improvement percentage factor and the minimum block improvement factor.

The qualified database record information may be aggregated based on information in the detail array. The process of aggregating the qualified database record information may include constructing a roll-up array based on the data in the detail array. The detail array may include one or more intersection points. An intersection point may include a first value for a block improvement percentage factor qualifying control variable and a second value for a minimum block improvement factor qualifying control variable. The roll-up array may include summary data for each intersection point. The summary data for a given intersection point may include summary data for each intersection point in the detail array that is greater than or equal to the first value for the block improvement percentage factor qualifying control variable for the given intersection point, and also greater than or equal to the second value for the minimum block improvement factor qualifying control variable for the given intersection point. The summary data for a given intersection point may include a total count of database records, a total blocks improved, and a total size of database records. Input/output saved per megabyte moved values may be calculated based on the summary data for each intersection point. The calculated input/output saved per megabyte moved values may be stored in a results tracking array.

A reorganization strategy may be recommended based on the aggregated qualified database record information. The recommended reorganization strategy may use one or more of the following user-specified guidance variables: a target percent of total qualified guidance variable; a target percent total size qualified guidance variable; a qualified guidance variable; a percent minimum megabytes moved guidance variable; a size minimum megabytes moved guidance variable; and a minimum input/output savings guidance variable. Recommended values for the qualifying control variables may be provided, based on the user-specified guidance variables. Alternate or additional recommended values for the qualifying control variables may be provided, based on the input/output saved per megabyte moved values in the results tracking array.

The recommended reorganization strategy may be that no reorganization of the database is required. The recommended reorganization strategy may be for an amount of reorganization of the database and a method of reorganization of the database. For example, the recommended amount of reorganization of the database may be a full reorganization of the database; and the recommended method of reorganization of the database may be an offline reorganization or concurrent reorganization of the database. Another example, the recommended amount of reorganization of the database may be a partial reorganization of the database; and the recommended method of reorganization of the database may be an offline reorganization or on-line reorganization of the database. The recommended reorganization strategy may be implemented. Concurrent updates to the database may be allowed while the reorganization strategy is implemented.

BRIEF DESCRIPTION OF THE DRAWINGS

A better understanding of the present invention can be obtained when the following detailed description of various embodiments is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Incorporation by Reference

The following material is hereby incorporated by reference as though fully and completely set forth herein:

U.S. application Ser. No. 09/615,569 titled "IMS On-line Reorganization Utility" and filed Jul. 13, 2000, whose inventors are James L. Martin Jr. and George Norman Crown, Jr., (Atty Docket 5253-03000);

U.S. application Ser. No. 09/496,241 titled "Hot Spot Analysis of IMS Databases" and filed Feb. 1, 2000, whose inventor is James L. Martin Jr., (Atty Docket 5253-02800).

Figure 1:
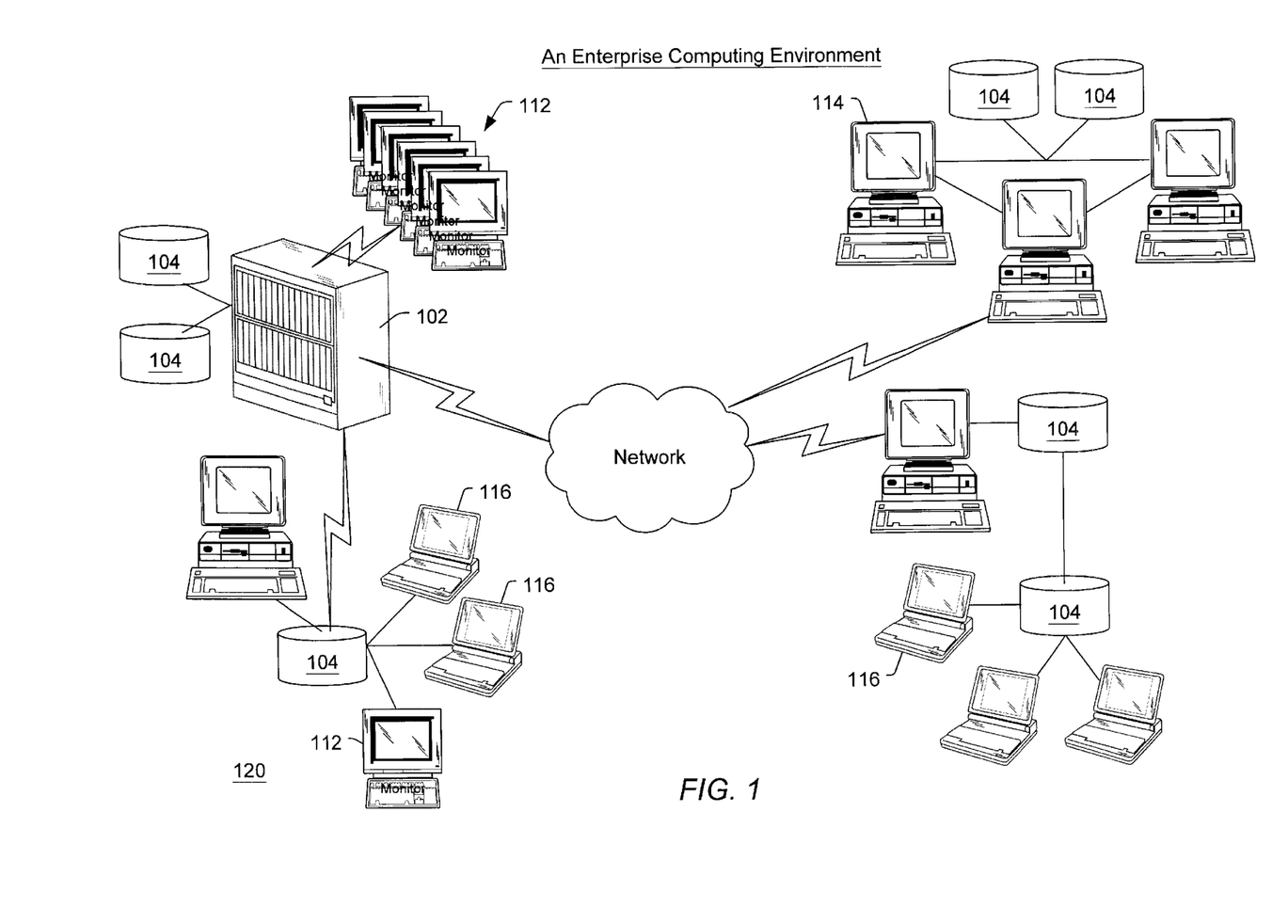
FIG. 1 illustrates an exemplary enterprise computing environment.

FIG. 1: An Enterprise Computing Environment

FIG. 1 illustrates an exemplary enterprise computing environment according to one embodiment of the present invention. As shown, the enterprise computing environment may include one or more computers 102, shown as mainframe computers 102, which each include one or more storage devices 104, also referred to as direct access storage devices (DASD). A plurality of computer systems or terminals 112 may be coupled to the mainframe computer 102, wherein the computer systems or terminals 112 access data stored in the storage devices 104 coupled to or comprised in the mainframe computer 102.

The mainframe computer system 102 may be coupled to one or more other computer systems and/or computer networks. The mainframe computer system 102 may be coupled locally to a computer system network 120 in a local area network (LAN) configuration, or may be coupled to one or more computer systems and/or networks through a wide area network (WAN), such as the Internet. As shown in FIG. 1, the mainframe computer system 102 may be directly coupled to a local area network 120, such as a PC-based or client/server based network. The LAN 120 may comprise a storage device or file server 104 coupled to one or more desktop computer systems 114, one or more portable computer systems 116 and possibly one or more computer systems or terminals 112. As also shown in FIG. 1, the mainframe computer 102 may also be coupled through a wide area network, represented by the "cloud" in FIG. 1, to one or more additional local area networks, such as PC-based networks as shown. Each of the PC based networks may comprise one or more storage devices or file servers 104 and one or more of either desktop computer systems 114 or portable computer systems 116. The wide area network may be any of various types, such as the Internet.

Each of the one or more mainframe computer systems 102, the computer systems 114 and 116, as well as file servers 104 may include various components as is standard in computer systems. For example, the mainframe computer system 102 may include one or more processors or CPUs, preferably multiple CPUs, as well as non-volatile memory, such as represented by elements 104, and various internal buses etc. as is well known in the art. In a similar manner, each of the desktop computer systems 114 and/or portable computer systems 116, or other computer systems comprised in the enterprise, comprise various standard computer components including one or more CPUs, one or more buses, memory, a power supply and non-volatile memory. The computer systems or terminals 112 may comprise standard "dumb" terminals as used with mainframes, i.e., may comprise a display and video hardware and/or memory for displaying data on the display provided from the mainframe computer system 102.

The mainframe computer system 102 may store a database comprising data which is desired to be accessible among a portion or all of the enterprise, e.g., is desired to be accessible by one or more of the computer systems 114 and 116. In the present application, the term "database" includes both databases and data sets, such as an IMS data set, among others. In one embodiment, the database stored in the mainframe computer system 102 is desired to be distributed among one or more of the various file servers 104 connected to the various computer systems 114 and 116. Thus, it is desired that the data comprising the database be distributed among the enterprise for ready access among multiple users. It is also possible that multiple different database management systems are used within the enterprise, i.e., one or more of the file systems 104 may store its own database which is desired to be replicated among various of the other file servers and/or the mainframe computer system 102. In the preferred embodiment, the database stored on the mainframe computer system is the IMS database. However, the present invention may be used with other types of databases.

The present invention preferably comprises software programs designed to analyze a database for the purpose of re-organizing the database while the database remains on-line and available to users. The software programs may be stored in the mainframe computer system 102 and/or one or more of the computer systems 114, 116 or 104 which operate to provide various services. Where the database used is the IMS database, the software programs are preferably comprised on the mainframe computer system 102. However, it is noted that portions of the software programs may be distributed throughout one or more computers in the enterprise. Also, the software programs preferably interface to one or more various OEM utilities.

One or more of the computer systems 102, 112, 114, and 116 preferably include a memory medium on which computer programs according to the invention may be stored. The term "memory medium" is intended to include an installation medium, e.g., a CD-ROM, or floppy disks, a computer system memory or random access memory such as DRAM, SRAM, EDO RAM, Rambus RAM, etc., or a non-volatile memory such as a magnetic media, e.g., a hard drive, "DASD", or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer systems 102/104, 112, 114, and 116 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software utility program or programs for analyzing a database for on-line reorganization of the database as described herein. The software program(s) may be implemented in any of various ways, including procedure-based techniques, component-based techniques, and/or object-oriented techniques, among others. For example, the software program may be implemented using ActiveX controls, C++ objects, Java objects, Microsoft Foundation Classes (MFC), or other technologies or methodologies, as desired. A computer system executing code and data from the memory medium comprises a means for creating and executing the software program or programs according to the methods and/or block diagrams described below.

Various embodiments further include receiving or storing instructions and/or data implemented in accordance with the foregoing description upon a carrier medium. Suitable carrier media include storage media or memory media as described above, as well as signals such as electrical, electromagnetic, or digital signals, conveyed via a communication medium such as networks 102 and/or 104 and/or a wireless link.

Definitions

As used herein, a "block improvement percentage factor (BIPF)" for a database record is the minimum percentage in terms of a reduction in blocks used by the database record after a reorganization. The BIPF for a database record may also be described as the amount of improvement in terms of database block usage of the database record after a reorganization. The BIPF for a database record may provide a way to view the improvement that may be obtained by reorganizing the database record. For example, consider a database record that uses 10 blocks prior to reorganization, and 5 blocks after reorganization; the database record yields a BIPF of 50% (i.e., BIPF=(pre-reorganization number of blocks−post-reorganization number of blocks)/(pre-reorganization number of blocks)=(10−5)/10=5/10=50%). The pre-reorganization number of blocks may be referred to as a current number of blocks. The post-reorganization number of blocks may be referred to as an optimal number of blocks. Another example yielding a BIPF of 50% may be a database record with current number of blocks=2 and optimal number of blocks=1, in this case BIPF=(2−1)/(2)= 50%.

As used herein, a "minimum block improvement (MBI)" for a database record is an amount of improvement in terms of database blocks saved. The MBI for a database record (DBR) may also be described as the amount of reduction or improvement in the number of database blocks used by the database record. The MBI for a database record may be used to qualify the BIPF for the database record when determining the actual benefit from reorganizing the DBR. Several combinations of post-reorganization number of blocks and pre-reorganization number of blocks may yield the same BIPF value (e.g., (10−5)/10 and (2−1)/2 both yield a 50% BIPF value, as shown in the previous examples). Thus all DBR's with the same BIPF value (e.g., 50%) may be ranked the same in terms of reorganization desirability if judged only using their BIPF values.

In one embodiment, these two weighting factors (BIPF and MBI) may be combined, thus requiring a minimum value for each factor before a DBR reorganization is implemented. For example, a user may choose to reorganize those database records which meet criteria for both factors (e.g., BIPF>=50% and MBI>=5, meaning that as long as the improvement in blocks is greater than or equal to 50% and the number of blocks saved is greater than or equal to 5, then the DBR reorganization should take place). In some cases, it might not be desirable to reorganize a DBR unless several blocks are saved during the process. Thus an MBI criteria may be added to a BIPF criteria to ensure that only those DBR's that meet both criteria are selected for reorganization.

Possible values used for BIPF and MBI for a particular database may have a wide range depending upon a number of variables and objectives set by the user. Determining optimal values for BIPF and MBI for any given database may be difficult due to the complexity and quantity of variables and objectives to be considered by the user. Among the techniques a user may employ to determine optimal values for BIPF and MBI are: (1) default values, (2) trial and error, (3) calculated estimates based upon experience as a DBA (database administrator), and (4) other such non-scientific methods.

It would be desirable to develop an approach to determining these values using programmatic techniques that may analyze the database and recommend optimal values for BIPF and MBI for the proposed reorganization of a database. In some cases, these programmatic techniques may recommend an on-line reorganization to de-fragment the database records; in other cases, another reorganization process may be recommended.

As used herein, "Input/Output (I/O) Saved per Megabyte of Data Moved" for a given database record is a calculation of how many I/O operations would be saved for one or more database records comprising one megabyte of data and exhibiting the same characteristics as the given database record (i.e., this value is not an indication of the actual number of Input/Output (I/O) operations that would be saved for the given database record). In one embodiment, a formula used to calculate "Input/Output (I/O) Saved per Megabyte of Data Moved" may be: ((Total I/O saved at plot point)*(1,000,000)/(total DBR size at plot point)), where a "plot point" indicates or specifies individual entries in a roll-up array. The "I/O Saved per Megabyte of Data Moved" value may be used as a weighting factor in determining the value from, or measuring the results of, reorganization of the database using a specific set of values for BIPF and MBI.

As used herein, "Total Database Population" is the total number of database records in a database. As used herein, "Total Qualified Population" is the total number of database records in a database that would benefit from reorganization based upon the combination of BIPF>=1% and MBI>=1.

Thus, those database records that meet both criteria (i.e., BIPF>=1% and MBI>=1) for improvement from the reorganization process may be further analyzed to determine if they meet any additional criteria specified by the user before being submitted for reorganization. In certain cases, the user may stop the analysis at this point, and submit all of the database records in the Total Qualified Population for reorganization. It is noted that the Total Qualified Population is a sub-set of the Total Database Population. The terms "Total Qualified Population", "pool of database records", and "qualified database pool" are synonyms; therefore, any reference to any of the three terms may be interchanged with either of the other two terms herein. In one embodiment, the "Total Qualified Population" may alternately be calculated using a user-specified value (e.g., "Minimum I/O Savings (MIS)", see definition below) for MBI instead of the default value of MBI>=1. Thus, using a user-specified value for MBI may limit the qualified database pool to database records that achieve a specific improvement in MBI.

As used herein, a "working storage array" may be used as a place to hold database information received from a database. In one embodiment, a working storage array may be stored in memory, or alternatively, a working storage array may be written to a direct access storage device (DASD) if the working storage array is too large to fit in memory. As various presentations or slices of the data in the working storage array are requested by a user, multiple retrievals of similar information regarding the state of the database may not be necessary. Thus, the working storage array may be referenced for the particular sub-set of information requested, based on user input, rather than requiring access to the database to retrieve the particular sub-set of information requested.

Figure 4:
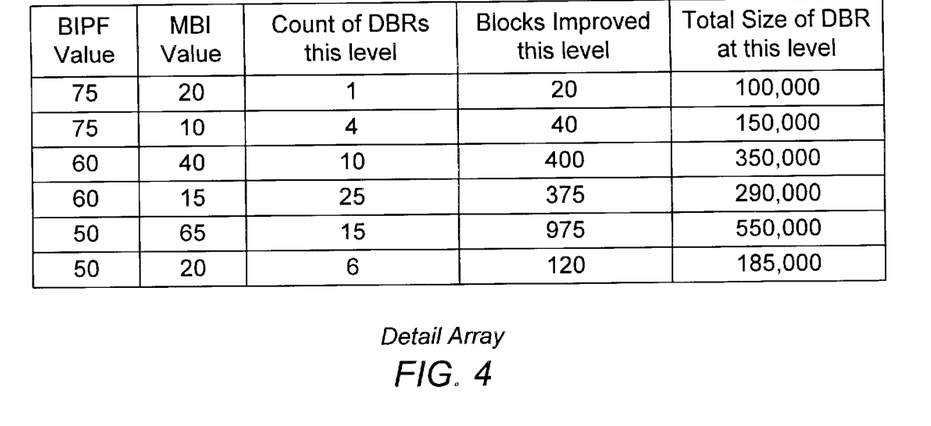
FIG. 4 illustrates an example of a Detail Array according to one embodiment.

As used herein, a "Detail Array" is a working storage array that represents the values for BIPF and MBI of all database records in the qualified database pool. The Detail Array entries may contain actual values of BIPF and MBI returned by database record analysis (e.g., analysis described in U.S. application Ser. No. 09/496,241, "Hot Spot Analysis of IMS Databases", referenced earlier). An example of a Detail Array is shown in FIG. 4.

When any database record is judged to be 'qualified' for reorganization (i.e., as defined in the definition for "Total Qualified Population"), the resulting values of BIPF and MBI for the record may be saved in the Detail Array. Other qualified database records with the same BIPF and MBI values may be summed in the Detail Array entry to show the total number of qualified database records and their characteristics at a specific array point. In one embodiment, the Detail Array entries may be sorted or chained in descending sequence by BIPF and MBI value pairs (i.e., highest BIPF and MBI value combination to lowest BIPF and MBI value combination).

Figure 5:
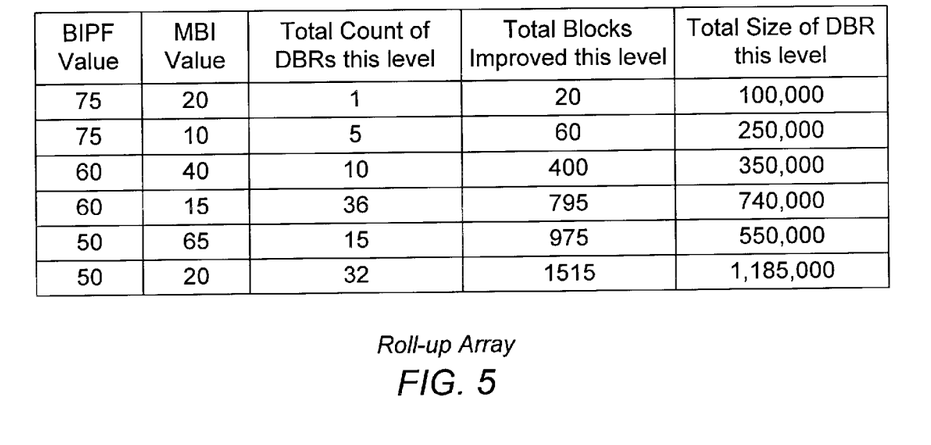
FIG. 5 illustrates an example of a Roll-up Array according to one embodiment.

As used herein, a "Roll-up Array" is a working storage array that represents consolidated information about database records (DBRs). The Roll-up Array may be created based upon detailed information contained in the Detail Array with the array entries chained together in descending order based upon BIPF and MBI value pairs. As noted above, a "plot point" is used to indicate or specify individual entries in a roll-up array. Thus, each entry in a roll-up array may be referred to as a "plot point". The terms "plot point" and "intersection point" are synonyms; therefore, any reference to "plot point" may be interchanged with "intersection point" herein. A distinguishing characteristic of a "Roll-up Array" may be that the data in the roll-up array at any given BIPF and MBI value pair represents the sum of all the data points in the detail array with BIPF and MBI value pairs equal to or greater than the given BIPF and MBI value pair. In FIG. 5, an example of a Roll-up Array corresponding to the Detail Array of FIG. 4 is shown.

As used herein, a "Reorganization Goal" is a user-specified objective for a database. Reorganization Goals may be specified in terms of database performance and/or database free space management. A "Reorganization Goal" may also be referred to as a "Guidance Variable".

The following six variables (i.e., "Target Percent of Total Qualified (TPTQ)", "Target Percent Total Size Qualified (TPTSQ)", "Minimum I/O Savings (MIS)", "Qualified (Q)", "Percent Minimum Megabytes Moved (PMMM)", and "Size Minimum Megabytes Moved (SMMM)") may be referred to as "Guidance Variables". Typically, a user would set values for these variables in a manner similar to that described for determining optimal values for BIPF and MBI (see above).

It is noted that any "default values" described herein for various variables may automatically change as a history of evaluations indicate better choices for a particular "default value" for a particular variable. Additionally, the variables defined herein are only examples. The invention is not intended to be limited to, nor to require, the specific variables set forth herein, but on the contrary, it is intended to cover user control in selecting reorganization goals. Thus, variables representing other reorganization goals, or representing the explicitly mentioned reorganization goals in different ways, may be added by the user.

As used herein, "Target Percent of Total Qualified (TPTQ)" is a percentage number after which the database may be considered to be in need of a full reorganization, based upon the number of qualified database records. In one embodiment, actual PTQ may be a calculated value using a formula: ((Qualified DBR count)/(Total DBR count)). The user may choose to specify a value for TPTQ, or a default TPTQ value may be used. When the actual PTQ exceeds the value set for TPTQ (i.e., a user-specified value, if one is specified, otherwise the default value), the database may be considered for a full reorganization.

As used herein, "Target Percent Total Size Qualified (TPTSQ)" is a percentage number after which the database may be considered to be in need of a full reorganization, based upon the size of the qualified database records. In one embodiment, actual PTSQ may be a calculated value using a formula: ((Qualified DBR size)/(Total DBR size)). The user may choose to specify a value for TPTSQ, or a default TPTSQ value may be used. When the actual PTSQ exceeds the value set for TPTSQ (i.e., a user-specified value, if one is specified, otherwise the default value), the database may be considered for a full reorganization.

As used herein, "Minimum I/O Savings (MIS)" is a minimum number of I/O operations (similar to MBI). MIS may be used to determine the size and number of database records in the qualified pool. When a value is specified for MIS, the MBI value used to find the qualified pool (i.e., normally MBI>=1) may be adjusted to MBI>=MIS; the BIPF value may remain the same (i.e., BIPF>=1%). When a MIS value is used to qualify a minimum MBI value for determining the pool of qualified DBRs, it may have an impact on all calculations and tests made using both the number and size of the qualified database record pool.

As used herein, "Qualified (Q)" is a Boolean variable with the values of Q being either "All" or "Any", where "All" signifies that both the TPTQ value and the TPTSQ value must be equaled or exceeded in order for the database to be considered as needing a full reorganization, and where "Any" signifies that either the TPTQ value or the TPTSQ value must be equaled or exceeded in order for the database to be considered as needing a full reorganization.

As used herein, "Percent Minimum Megabytes Moved (PMMM)" is a variable with two values, where one of the values represents "Full PMMM" and the other value represents "Partial PMMM", as described below. PMMM is the minimum size of the qualified database record pool (specified as a percentage of total database size) before any type of reorganization (e.g., full or partial) may be considered. When the size of the qualified database pool exceeds the 'full' size specification, a full reorganization may be considered. When the size of the qualified database pool size exceeds the 'partial' size specification, a partial reorganization may be considered. The values may be expressed as a percentage of the size of the entire database (e.g., "Partial PMMM"=35% may mean that the qualified pool must be at least 35% of the entire database for a partial reorganization consideration). Specifying a value for PMMM (either "Full PMMM" or "Partial PMMM") may affect how the values for BIPF and MBI are selected. For example, if "Full PMMM" has no value set, "Partial PMMM" has a value set (e.g., 28%), and the values of BIPF and MBI are used to determine that the percentage of the entire database which may be considered a "qualified pool" is 27%, then a partial reorganization may not be considered. Modifying the previous example such that the "qualified pool" percentage is 28% or more would allow for partial reorganization to be considered. In the case when partial reorganization may be considered, the first BIPF and MBI value pair in the Results Tracking Array that result in moving a qualified database records pool greater than or equal to the specified percentage (i.e., the "Partial PMMM" percentage) of the database may be used as input to the on-line reorganization process.

As used herein, "Size Minimum Megabytes Moved (SMMM)" is a variable with two values, where one of the values represents "Full SMMM" and the other value represents "Partial SMMM", as described below. SMMM is the minimum size of the qualified database record pool (specified in kilobytes) before any type of reorganization (e.g., full or partial) may be considered. When the size of the qualified database pool exceeds the 'full' size specification, a full reorganization may be considered. When the size of the qualified database pool size exceeds the 'partial' size specification, a partial reorganization may be considered. The values may be expressed as an actual size of the qualified database pool (e.g., "Partial SMMM" 2000 may mean that the qualified pool must be at least 2000 kilobytes for a partial reorganization consideration). Specifying a value for SMMM (either "Full SMMM" or "Partial SMMM") may affect how the values for BIPF and MBI are selected. For example, if "Full SMMM" has no value set, "Partial SMMM" has a value set (e.g., 2000), the values of BIPF and MBI are used to determine that the percentage of the entire database which may be considered a "qualified pool" is 27%, and that 27% represents 1800 kilobytes, then a partial reorganization may not be considered. Modifying the previous example such that the "qualified pool" percentage is 28% or more, thus representing 2000 kilobytes or more, would allow for partial reorganization to be considered. This example combines the use of PMMM and SMMM. It is noted that SMMM may be used on its own, without values for PMMM being set. Similarly, PMMM may also be used on its own, without values for SMMM being set.

In the case when partial reorganization may be considered, the first BIPF and MBI value pair in the Results Tracking Array that result in moving a qualified database records pool greater than or equal to the specified size (i.e., the "Partial SMMM" number of kilobytes) of the database may be used as input to the on-line reorganization process.

Figure 2:
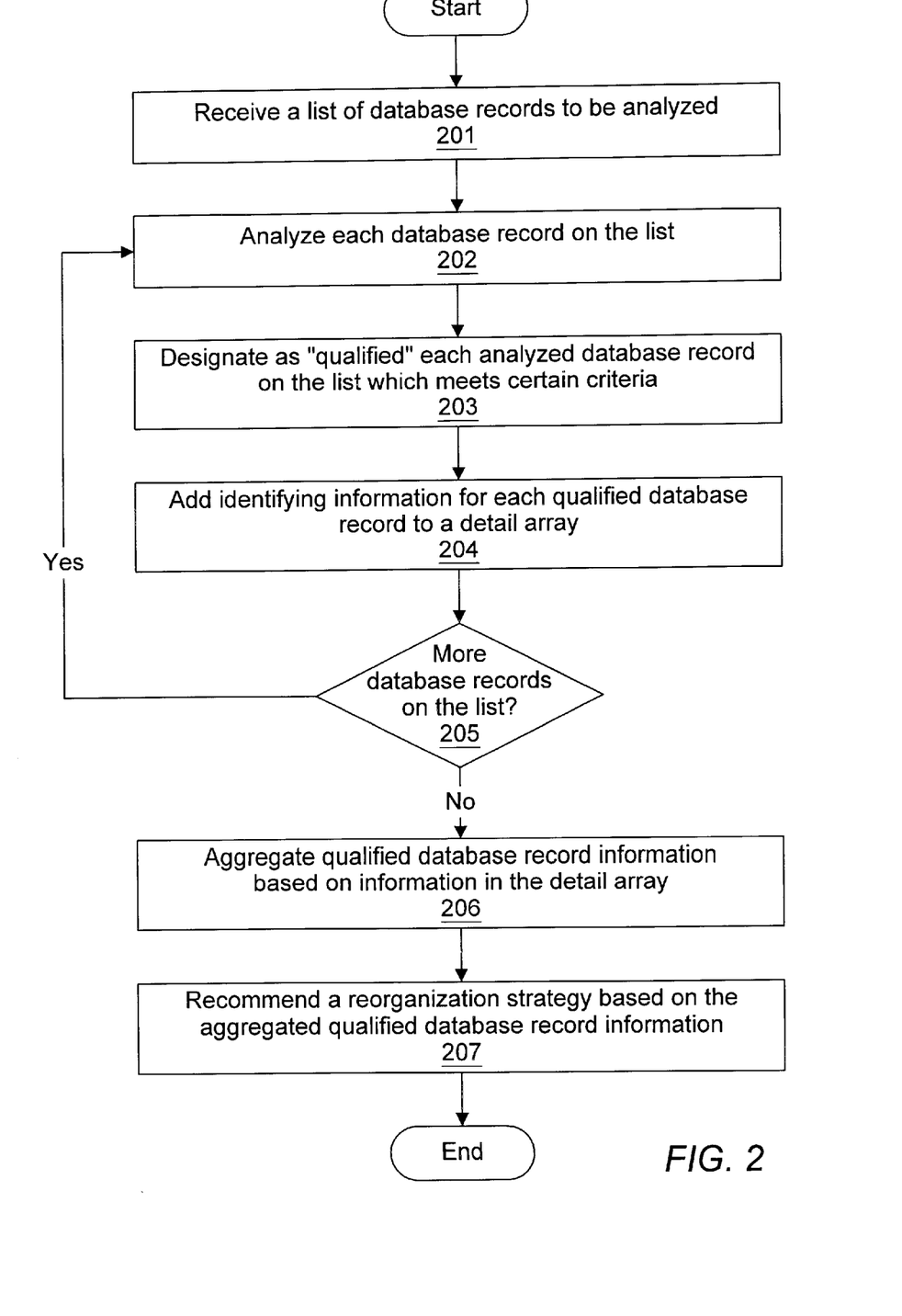
FIG. 2 is a flowchart illustrating an overview of analyzing a database for on-line reorganization of the database according to one embodiment.

FIG. 2: One Embodiment of On-Line Reorganization of a Database

FIG. 2 is a flowchart of an embodiment of a system and method for analyzing a database for on-line reorganization of the database. The on-line reorganization of the database is preferably optimal.

In step 201, a list of database records to be analyzed may be received. This list may include a keyword (i.e., "ALL"), or may identify individual database records. If a keyword is used, the database records represented by the keyword are to be analyzed. For example, the "ALL" keyword indicates all of the database records (i.e., the entire database) are to be analyzed. In step 202, each database record on the list may be analyzed. In some cases, updates to the database may be performed while the analyzing occurs.

In step 203, each analyzed database record on the list which meets certain criteria may be designated as "qualified". The qualification process may use one or more qualifying control variables to determine if each database record is a qualified database record. The qualifying control variables may include: a block improvement percentage factor, a minimum block improvement factor, and/or a minimum input/output savings factor. In one embodiment, the criteria for the block improvement percentage factor may be greater than or equal to one percent and the criteria for the minimum block improvement factor may be greater than or equal to one. Alternatively, the criteria for the block improvement percentage factor may be greater than or equal to one percent and the criteria for the minimum block improvement factor may be equal to the minimum input/output savings factor.

In step 204, identifying information for each qualified database record may be added to a detail array. Identifying information may include: creating an entry in the detail array upon the first occurrence of values for a given set of qualifying control variables. The given set of qualifying control variables may include the block improvement percentage factor and the minimum block improvement factor. The entry in the detail array may include a count element, a blocks improved element, and a total size of database record element. The count element of a given entry in the detail array may be incremented when a second or subsequent occurrence of the values for the given set of qualifying control variables is found. The blocks improved element of a given entry in the detail array may be incremented when a second or subsequent occurrence of the values for the given set of qualifying control variables is found. The total size of database record element of a given entry in the detail array may be incremented when a second or subsequent occurrence of the values for the given set of qualifying control variables is found.

In step 205, a looping process through steps 202, 203, and 204 may be repeated until each database record on the list is analyzed.

In step 206, qualified database record information may be aggregated based on information in the detail array. The aggregation process may include constructing a roll-up array based on the data in the detail array. The detail array may include one or more intersection points. An intersection point may include a first value for a block improvement percentage factor qualifying control variable and a second value for a minimum block improvement factor qualifying control variable. The roll-up array may include summary data for each intersection point.

The summary data for a given intersection point may include summary data for each intersection point in the detail array that is greater than or equal to the first value for the block improvement percentage factor qualifying control variable for the given intersection point, and also greater than or equal to the second value for the minimum block improvement factor qualifying control variable for the given intersection point. The summary data for a given intersection point may also include a total count of database records, a total blocks improved, and a total size of database records. Input/output saved per megabyte moved values may be calculated based on the summary data for each intersection point. The input/output saved per megabyte moved values may be stored in a results tracking array.

In step 207, a reorganization strategy may be recommended based on the aggregated qualified database record information. The recommended reorganization strategy may include using one or more of user-specified guidance variables (e.g., a target percent of total qualified guidance variable; a target percent total size qualified guidance variable; a qualified guidance variable; a percent minimum megabytes moved guidance variable; a size minimum megabytes moved guidance variable; and a minimum input/output savings guidance variable. Recommended values for the qualifying control variables may be provided, based on the user-specified guidance variables. Alternate or additional recommended values for the qualifying control variables may be provided, based on the input/output saved per megabyte moved values in the results tracking array.

The recommended reorganization strategy may be that no reorganization of the database is required. The recommended reorganization strategy may be for an amount of reorganization of the database and a method of reorganization of the database. For example, the recommended amount of reorganization of the database may be a full reorganization of the database; and the recommended method of reorganization of the database may be an offline reorganization or concurrent reorganization of the database. Another example, the recommended amount of reorganization of the database may be a partial reorganization of the database; and the recommended method of reorganization of the database may be an offline reorganization or on-line reorganization of the database. The recommended reorganization strategy may be implemented. Concurrent updates to the database may be allowed while the reorganization strategy is implemented.

FIG. 3: Examples of Fragmented Database Records in an IMS Database

FIG. 3 illustrates an exemplary portion of an IMS database including two fragmented database records. A database record begins with a root segment and may have one or more child segments associated with it. As shown, this portion of an IMS database includes four blocks labeled "Block 1", "Block 4", "Block 6", and "Block 7". Block 1 contains segments 1, 2, and 3; Block 4 contains segments 31 and 32; Block 6 contains segment 52; and Block 7 contains segment 63. Segments 1 and 3 are root segments, and all of the other segments are child segments. In general, as new child segments are added to an IMS database hierarchy, the segments may be added to blocks depending on space availability. As a result, related segments (i.e., segments belonging to the same database record) may be stored in different blocks, possibly non-contiguous blocks. This results in a fragmented database, as shown in FIG. 3. As a result, access of a database record may require reading a number of non-contiguous blocks, which results in lengthier access times. For example, retrieving the database record beginning with root segment 1 requires 3 blocks to be read, as follows: read block 1 to obtain segments 1 and 2; read block 6 to obtain segment 52; read block 4 to obtain segment 31. Similarly, retrieving the database record beginning with root segment 3 also requires 3 blocks to be read, as follows: read block 1 to obtain segment 3; read block 4 to obtain segment 32; read block 7 to obtain segment 63.

Figure 6:
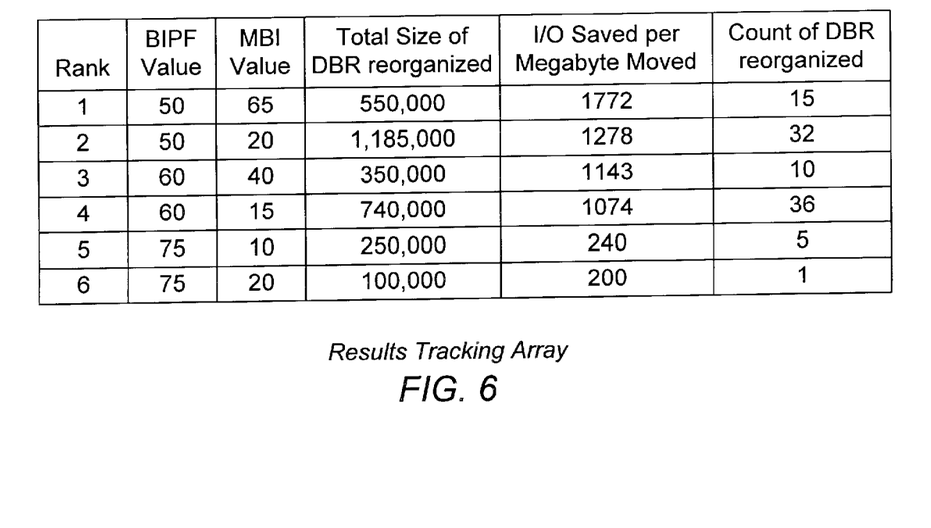
FIG. 6 illustrates an example of a Results Tracking Array according to one embodiment.

FIG. 4–6: Example Detail, Roll-up, and Results Tracking Arrays

The array examples in FIGS. 4–6 may be "logical" examples (i.e., not "physically" implemented as described). For example, some values, such as the "Blocks Improved this level" column in the Detail Array of FIG. 4, may be calculated. One formula for calculating the "Blocks Improved this level" column in the Detail Array of FIG. 4 may be: (MBI)*(DBR count).

FIG. 4: Example Detail Array

FIG. 4 illustrates one embodiment of a Detail Array. As shown, the columns in the example Detail Array of FIG. 4 are: BIPF Value, MBI Value, Count of DBRs this level, Blocks Improved this level, and Total Size of DBR at this level. In alternate embodiments, additional columns may exist. The entries or rows in the Detail Array may be chained together in descending sequence by BIPF and MBI value pairs (i.e., highest BIPF and MBI value combination to lowest BIPF and MBI value combination).

As shown the first row of the Detail Array has a BIPF value of 75 and a MBI value of 20. Candidates for the second row of the Detail Array of FIG. 4 may have a BIPF value of 75 or lower. All entries or rows in the Detail Array having a value for BIPF of 75 appear before any entries or rows in the Detail Array having a value for BIPF of less than 75. Thus the Detail Array is sorted first on BIPF value, and second on MBI value. The remaining values for the first row of the Detail Array are: Count of DBRs this level=1, Blocks Improved this level=20, and Total Size of DBR at this level=100,000.

The second row of the Detail Array has the following values: BIPF value=75, MBI value=10, Count of DBRs this level=4, Blocks Improved this level=40, and Total Size of DBR at this level=150,000.

The third row of the Detail Array has the following values: BIPF value=60, MBI value=40, Count of DBRs this level=10, Blocks Improved this level=400, and Total Size of DBR at this level=350,000.

The fourth row of the Detail Array has the following values: BIPF value=60, MBI value=15, Count of DBRs this level=25, Blocks Improved this level=375, and Total Size of DBR at this level=290,000.

The fifth row of the Detail Array has the following values: BIPF value=50, MBI value=65, Count of DBRs this level=15, Blocks Improved this level=975, and Total Size of DBR at this level=550,000.

The sixth row of the Detail Array has the following values: BIPF value=50, MBI value=20, Count of DBRs this level=6, Blocks Improved this level=120, and Total Size of DBR at this level=185,000.

FIG. 5: Example Roll-up Array

FIG. 5 illustrates one embodiment of a Roll-up Array. As shown, the columns in the example Roll-up Array of FIG. 5 are: BIPF Value, MBI Value, Total Count of DBRs this level, Total Blocks Improved this level, and Total Size of DBR at this level. In alternate embodiments, additional columns may exist. Similar to the Detail Array, the entries or rows in the Roll-up Array may be chained together in descending sequence by BIPF and MBI value pairs (i.e., highest BIPF and MBI value combination to lowest BIPF and MBI value combination).

The Roll-up Array of FIG. 5 corresponds to the Detail Array of FIG. 4, as such, both array have the same BIPF and MBI value pairs, appearing in the same order (i.e., Row 1 has BIPF=75, MBI=20, Row 2 has BIPF=75, MBI=10, Row 3 has BIPF=60, MBI=40, Row 4 has BIPF=60, MBI=15, Row 5 has BIPF=50, MBI=65, and Row 6 has BIPF=50, MBI=20). Another similarity with the Detail Array is that the Roll-up Array may also be sorted first on BIPF value, and second on MBI value. Each plot point or BIPF-MBI value pair (e.g., 60-15) in the Roll-up Array, may contain the sum of data from all points in the Detail Array with both BIPF values and MBI values equal to or greater than the BIPF-MBI value pair in the Roll-up Array (i.e., for the 60-15 example, the Detail Array points which are summed include 75-20, 60-40, and 60-15).

The first row of the Roll-up Array has the following values: Total Count of DBRs this level=1, Total Blocks Improved this level=20, and Total Size of DBR at this level=100,000. It is noted that the values for the first row in both the Detail Array and the Roll-up Array (i.e., the 75-20 row) match exactly (i.e., "Count of DBRs this level"="Total Count of DBRs this level"=1, "Blocks Improved this level"= "Total Blocks Improved this level"=20, and "Size of DBR at this level"="Total Size of DBR at this level"=100,000). Although there is one other entry in the Detail Array with BIPF value of 75 or greater, (i.e., 75-10), the MBI values (i.e., 10) corresponding to this entry is less than the MBI value for the row in question (i.e., 20), thus the "Total" values in the summation row in the Roll-up Array match the values in the corresponding row in the Detail Array.

The second row of the Roll-up Array has the following values: Total Count of DBRs this level=5, Total Blocks Improved this level=60, and Total Size of DBR at this level=250,000.

The third row of the Roll-up Array has the following values: Total Count of DBRs this level=10, Total Blocks Improved this level=400, and Total Size of DBR at this level=350,000. It is noted that the values for the third row in both the Detail Array and the Roll-up Array (i.e., the 60-40 row) match exactly (i.e., "Count of DBRs this level"="Total Count of DBRs this level"=10, "Blocks Improved this level"="Total Blocks Improved this level"=400, and "Size of DBR at this level"="Total Size of DBR at this level"= 350,000). Although there are entries in the Detail Array with BIPF values of 60 or greater, (i.e., 60-15, 75-10, and 75-20), the MBI values (i.e., 15, 10, and 20) corresponding to these entries are each less than the MBI value for the row in question (i.e., 40), thus the "Total" values in the summation row in the Roll-up Array match the values in the corresponding row in the Detail Array.

The fourth row of the Roll-up Array has the following values: Total Count of DBRs this level=36, Total Blocks Improved this level=795, and Total Size of DBR at this level=740,000. It is noted that the roll-up processing includes values from the BIPF-MBI pairs 60-15, 60-40, and 75-20 from the Detail Array, and excludes values from the 75-10 BIPF-MBI pair in the Detail Array, as the MBI=10 value is less than the MBI=15 for this fourth row of the Roll-up Array.

The fifth row of the Roll-up Array has the following values: Total Count of DBRs this level=15, Total Blocks Improved this level=975, and Total Size of DBR at this level=550,000. It is noted that the values for the fifth row in both the Detail Array and the Roll-up Array (i.e., the 50-65 row) match exactly (i.e., "Count of DBRs this level"="Total Count of DBRs this level"=15, "Blocks Improved this level"="Total Blocks Improved this level"=975, and "Size of DBR at this level"="Total Size of DBR at this level"= 550,000). Although there are entries in the Detail Array with BIPF values of 50 or greater, (i.e., 50-20, 60-15, 60-40, 75-10, and 75-20), the MBI values (i.e., 20, 15, 40, 10, and 20) corresponding to these entries are each less than the MBI value for the row in question (i.e., 65), thus the "Total" values in the summation row in the Roll-up Array match the values in the corresponding row in the Detail Array.

The sixth row of the Roll-up Array has the following values: Total Count of DBRs this level=32, Total Blocks Improved this level=1515, and Total Size of DBR at this level=1,185,000.

FIG. 6: Example Results Tracking Array

FIG. 6 illustrates one embodiment of a Results Tracking Array. As shown, the columns in the example Results Tracking Array of FIG. 6 are: Rank, BIPF Value, MBI Value, Total Size of DBR reorganized, I/O Saved per Megabyte Moved, and Count of DBR reorganized. In alternate embodiments, additional columns may exist. The Results Tracking Array of FIG. 6 corresponds to the Roll-up Array of FIG. 5 and the Detail Array of FIG. 4, as such, all three arrays have the same BIPF and MBI value pairs, although the column or key on which the data is sorted differs (i.e., the Detail Array and the Roll-up Array are sorted in descending sequence by BIPF and MBI value pairs whereas the Results Tracking Array is sorted by the "I/O saved per megabyte moved" column).

The Results Tracking Array may be used to track the results of analysis of the qualified population. The key or unique column of this array is "I/O saved per megabyte moved". The "I/O saved per megabyte moved" value may be calculated by scanning the roll-up array, calculating the "I/O saved per megabyte moved" values, and creating the resulting array entry. It is noted that the Results Tracking Array is sorted in descending order of the "I/O saved per megabyte moved" column. The value in the "I/O saved per megabyte moved" column is a calculated value used for weighting, not an actual number of megabytes moved. The "I/O saved per megabyte moved" value for a particular BIPF and MBI value pair (e.g., 50-65) may be calculated using the values for total size accumulated to a specific level and the total I/O saved (i.e., MBI) accumulated at a specific level. In one embodiment, when more than one BIPF and MBI value pair in the roll-up array yield the same "I/O saved per megabyte moved" value, the BIPF and MBI value pair with the lowest values may be saved in the Results Tracking Array.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method for analyzing a database for determining an approach for reorganization of the database, the method comprising:
(a) receiving a list of database records to be analyzed;
(b) analyzing each database record on the list wherein updates to the database are performed while the analyzing occurs;
(c) designating as "qualified" each analyzed database record on the list which meets certain criteria;
(d) adding identifying information for each qualified database record having a given set of qualifying control variables to a detail array, each detail array entry comprising a count element, a blocks improved element and a total size of database record element;

(e) repeating (b) through (d) until each database record on the list is analyzed, wherein said act of repeating includes incrementing the count element, the blocks improved element and the total size of database record element of a given detail array entry when a second or subsequent occurrence of the values for the given set of qualifying control variables is found;

(f) aggregating qualified database record information based on information in the detail array; and (g) recommending a reorganization strategy based on the aggregated qualified database record information.

2. The method of claim 1, wherein the qualifying control variables comprise one or more of: a block improvement percentage factor, a minimum block improvement factor, and a minimum input/output savings factor.

3. The method of claim 2, wherein the criteria for the block improvement percentage factor is greater than or equal to one percent and the criteria for the minimum block improvement factor is greater than or equal to one.

4. The method of claim 2, wherein the criteria for the block improvement percentage factor is greater than or equal to one percent and the criteria for the minimum block improvement factor is equal to the minimum input/output savings factor.

5. The method of claim 1, wherein the given set of qualifying control variables comprises the block improvement percentage factor and the minimum block improvement factor.

6. The method of claim 1, wherein aggregating qualified database record information based on information in the detail array further comprises:

constructing a roll-up array based on the data in the detail array;

wherein the detail array comprises one or more intersection points;

wherein an intersection point comprises a first value for a block improvement percentage factor qualifying control variable and a second value for a minimum block improvement factor qualifying control variable;

wherein the roll-up array comprises summary data for each intersection point.

7. The method of claim 6, wherein the summary data for a given intersection point comprises summary data for each intersection point in the detail array that is greater than or equal to the first value for the block improvement percentage factor qualifying control variable for the given intersection point, and also greater than or equal to the second value for the minimum block improvement factor qualifying control variable for the given intersection point.

8. The method of claim 7, wherein the summary data for a given intersection point comprises a total count of database records, a total blocks improved, and a total size of database records.

9. The method of claim 6, further comprising:

calculating input/output saved per megabyte moved values based on the summary data for each intersection point; and storing the input/output saved per megabyte moved values in a results tracking array.

10. The method of claim 1, wherein recommending a reorganization strategy based on the aggregated qualified database record information further comprises using one or more of the following user-specified guidance variables:

a target percent of total qualified guidance variable;
a target percent total size qualified guidance variable;
a qualified guidance variable;
a percent minimum megabytes moved guidance variable;
a size minimum megabytes moved guidance variable; and
a minimum input/output savings guidance variable.

11. The method of claim 10, wherein recommending a reorganization strategy based on the aggregated qualified database record information further comprises recommending that no reorganization of the database is required.

12. The method of claim 10, wherein recommending a reorganization strategy based on the aggregated qualified database record information further comprises:

recommending an amount of reorganization of the database; and recommending a method of reorganization of the database.

13. The method of claim 12, wherein recommending the amount of reorganization of the database comprises recommending a full reorganization of the database; and wherein recommending the method of reorganization of the database comprises recommending an off-line reorganization or concurrent reorganization of the database.

14. The method of claim 12, wherein recommending the amount of reorganization of the database comprises recommending a partial reorganization of the database; and wherein recommending the method of reorganization of the database comprises recommending an off-line reorganization of the database.

15. The method of claim 12, wherein recommending the amount of reorganization of the database comprises recommending a partial reorganization of the database; and wherein recommending the method of reorganization of The database comprises recommending an on-line reorganization of the database.

16. The method of claim 15, wherein designating as "qualified" each analyzed database record on the list which meets certain criteria further comprises:

using one or more qualifying control variables to determine if each database record is a qualified database record;

wherein the qualifying control variables comprise one or more of: a block improvement percentage factor, a minimum block improvement factor, and a minimum input/output savings factor;

wherein recommended values for the qualifying control variables are provided;

wherein the recommended values for the qualifying control variables are based on the user-specified guidance variables.

17. The method of claim 15, wherein aggregating qualified database record information based on information in the detail array further comprises:

constructing a roll-up array based on the data in the detail array;

wherein the detail array comprises one or more intersection points;

wherein an intersection point comprises a first value for a block improvement percentage factor qualifying control variable and a second value for a minimum block improvement factor qualifying control variable;

wherein the roll-up array comprises summary data for each intersection point;

calculating input/output saved per megabyte moved values based on the summary data for each intersection point; and storing the input/output saved per megabyte moved values in a results tracking array.

18. The method of claim 17, wherein the summary data for a given intersection point comprises summary data for each intersection point in the detail array that is greater than or equal to the first value for the block improvement percentage factor qualifying control variable for the given intersection point, and also greater than or equal to the second value for the minimum block improvement factor qualifying control variable for the given intersection point.

19. The method of claim 17, wherein:
recommended values for the qualifying control variables are provided; and
wherein the recommended values for the qualifying control variables are based on the input/output saved per megabyte moved values in the results tracking array.

20. The method of claim 1, further comprising:
implementing the reorganization strategy; and
allowing concurrent updates to the database while the reorganization strategy is implemented.

21. A system for analyzing a database for determining an approach for reorganization of the database, the system comprising:
a network;
a CPU coupled to the network;
a memory coupled to the CPU which stores an INS database;
a system memory coupled to the CPU, wherein the system memory stores one or more computer programs executable by the CPU;
wherein the computer programs are executable to:
(a) receive a list of database records to be analyzed;
(b) analyze each database record on the list wherein updates to the database are performed while the analyzing occurs;
(c) designate as "qualified" each analyzed database record on the list which meets certain criteria;
(d) add identifying information for each qualified database record having a given set of qualifying control variables to a detail array, each detail array entry comprising a count element a blocks improved element and a total size of database record element;
(e) repeat (b) through (d) until each database record on the list is analyzed, including incrementing the count element the blocks improved element and the total size of database record element of a given detail array entry when a second or subsequent occurrence of the values for the given set of qualifying control variables is found;
(f) aggregate qualified database record information based on information in the detail array; and
(g) recommend a reorganization strategy based on the aggregated qualified database record information.

22. The system of claim 21, wherein in designating as "qualified" each analyzed database record on the list which meets certain criteria the computer programs are further executable to: use one or more qualifying control variables to determine if each database record is a qualified database record;
wherein the qualifying control variables comprise one or more of: a block improvement percentage factor, a minimum block improvement factor, and a minimum input/output savings factor.

23. The system of claim 22, wherein the criteria for the block improvement percentage factor is greater than or equal to one percent and the criteria for the minimum block improvement factor is greater than or equal to one.

24. The system of claim 22, wherein the criteria for the block improvement percentage factor is greater than or equal to one percent and the criteria for the minimum block improvement factor is equal to the minimum input/output savings factor.

25. The system of claim 21, wherein the given set of qualifying control variables comprises the block improvement percentage factor and the minimum block improvement factor.

26. The system of claim 21, wherein in aggregating qualified database record information based on information in the detail array the computer programs are further executable to:
construct a roll-up array based on the data in the detail array;
wherein the detail array comprises one or more intersection points;
wherein an intersection point comprises a first value for a block improvement percentage factor qualifying control variable and a second value for a minimum block improvement factor qualifying control variable;
wherein the roll-up array comprises summary data for each intersection point.

27. The system of claim 26, wherein the summary data for a given intersection point comprises summary data for each intersection point in the detail array that is greater than or equal to the first value for the block improvement percentage factor qualifying control variable for the given intersection point, and also greater than or equal to the second value for the minimum block improvement factor qualifying control variable for the given intersection point.

28. The system of claim 27, wherein the summary data for a given intersection point comprises a total count of database records, a total blocks improved, and a total size of database records.

29. The system of claim 26, wherein the computer programs are further executable to:
calculate input/output saved per megabyte moved values based on the summary data for each intersection point; and
store the input/output saved per megabyte moved values in a results tracking array.

30. The system of claim 21, wherein in recommending a reorganization strategy based on the aggregated qualified database record information the computer programs are further executable to use one or more of the following user-specified guidance variables:
a target percent of total qualified guidance variable;
a target percent total size qualified guidance variable;
a qualified guidance variable;
a percent minimum megabytes moved guidance variable;
a size minimum megabytes moved guidance variable; and
a minimum input/output savings guidance variable.

31. The system of claim 30, wherein in recommending a reorganization strategy based on the aggregated qualified database record information the computer programs are further executable to recommend that no reorganization of the database is required.

32. The system of claim 30, wherein in recommending a reorganization strategy based on the aggregated qualified database record information the computer programs are further executable to;
recommend an amount of reorganization of the database; and
recommend a method of reorganization of the database.

33. The system of claim 32 wherein the computer programs are further executable to:

recommend the amount of reorganization of the database comprises a full reorganization of the database; and recommend the method of reorganization of the database comprises an off-line reorganization or concurrent reorganization of the database.

34. The system of claim 32, wherein the computer programs are further executable to:

recommend the amount of reorganization of the database comprises a partial reorganization of the database; and recommend the method of reorganization of the database comprises an off-line reorganization of the database.

35. The system of claim 34, wherein the computer programs are further executable to:

recommend the amount of reorganization of the database comprises a partial reorganization of the database; and recommend the method of reorganization of the database comprises an on-line reorganization of the database.

36. The system of claim 35, wherein in designating as "qualified" each analyzed database record on the list which meets certain criteria the computer programs are further executable to:

use one or more qualifying control variables to determine it each database record is a qualified database record;

wherein the qualifying control variables comprise one or more of: a block improvement percentage factor, a minimum block improvement factor, and a minimum input/output savings factor;

wherein recommended values for the qualifying control variables are provided;

wherein the recommended values for the qualifying control variables are based on the user-specified guidance variables.

37. The system of claim 35, wherein in aggregating qualified database record information based on information in the detail array the computer programs are further executable to:

construct a roll-up array based on the data in the detail array;

wherein the detail array comprises one or more intersection points;

wherein an intersection point comprises a first value for a block improvement percentage factor qualifying control variable and a second value for a minimum block improvement factor qualifying control variable;

wherein the roll-up array comprises summary data for each intersection point;

calculate input/output saved per megabyte moved values based on the summary data for each intersection point; and store the input/output saved per megabyte moved values in a results tracking array.

38. The system of claim 37, wherein the summary data for a given intersection point comprises summary data for each intersection point in the detail array that is greater than or equal to the first value for the block improvement percentage factor qualifying control variable for the given intersection point, and also greater than or equal to the second value for the minimum block improvement factor qualifying control variable for the given intersection point.

39. The system of claim 37, wherein:

recommended values for the qualifying control variables are provided; and wherein the recommended values for the qualifying control variables are based on the input/output saved per megabyte moved values in the results tracking array.

40. The system of claim 21, wherein the computer programs are further executable to:

implement the reorganization strategy; and allow concurrent updates to the database while the reorganization strategy is implemented.

41. A carrier medium which stores program instructions for analyzing a database for determining an approach for reorganization of the database, wherein the program instructions are executable to implement:

(a) receiving a list of database records to be analyzed;

(b) analyzing each database record on the list wherein updates to the database are performed while the analyzing occurs;

(c) designating as "qualified" each analyzed database record on the list which meets certain criteria;

(d) adding identifying information for each qualified database record having a given set of qualifying control variables to a detail array, each detail array entry comprising a count element, a blocks improved element and a total size of database record element;

(e) repeating (b) Through (d) until each database record on the list is analyzed, wherein said act of repeating includes incrementing the count element, the blocks improved element and the total size of database record element of a given detail array entry when a second or subsequent occurrence of the values for the given set of qualifying control variables is found;

(f) aggregating qualified database record information based on information in the detail array; and (g) recommending a reorganization strategy based on the aggregated qualified database record information.

42. The carrier medium of claim 41, wherein the carrier medium is a memory medium.

* * * * *